United States Patent
Murakami et al.

[15] 3,672,243
[45] June 27, 1972

[54] FLUID PRESSURE CONTROL MECHANISM

[72] Inventors: Noboru Murakami; Koichiro Hirozawa, both of Kariya, Japan

[73] Assignee: Aisin Seiki Kabushiki Kaisha, Kariya Aichi Pref., Japan

[22] Filed: June 1, 1970

[21] Appl. No.: 42,420

[30] Foreign Application Priority Data

May 30, 1969 Japan..................................44/42839
June 21, 1969 Japan..................................44/49249

[52] U.S. Cl.....................................74/753, 74/867, 74/751, 192/109 F
[51] Int. Cl......................F16h 3/74, F16h 5/42, B60k 21/00
[58] Field of Search....................74/751, 753, 781; 192/109 F

[56] References Cited

UNITED STATES PATENTS

| 3,251,245 | 5/1966 | Foerster.....................................74/751 |
| 3,251,246 | 5/1966 | Foerster et al.............................74/751 |
| 3,381,547 | 5/1968 | Forster et al..............................74/781 |

*Primary Examiner*—Arthur T. McLeon
*Attorney*—Sughrue, Rothwell, Mion, Zinn & Macpeak

[57] ABSTRACT

In a fluid operated speed change mechanism the hydraulic pressure from a supply source is subjected to a pressure adjustment by a suitable control valve and is selectively supplied to a fluid motor which controls the engagement of a brake band in the planetary gearing. The reaction force caused by engagement of the brake band is transmitted mechanically or fluidically to the pressure adjusting control valve in a manner to increase the fluid pressure being supplied to the fluid motor thereby increasing the braking force of the brake band to prevent undue slippage. When the brake band is not applied, no reaction force can be transmitted to the control valve and the control valve will function in the normal manner.

4 Claims, 7 Drawing Figures

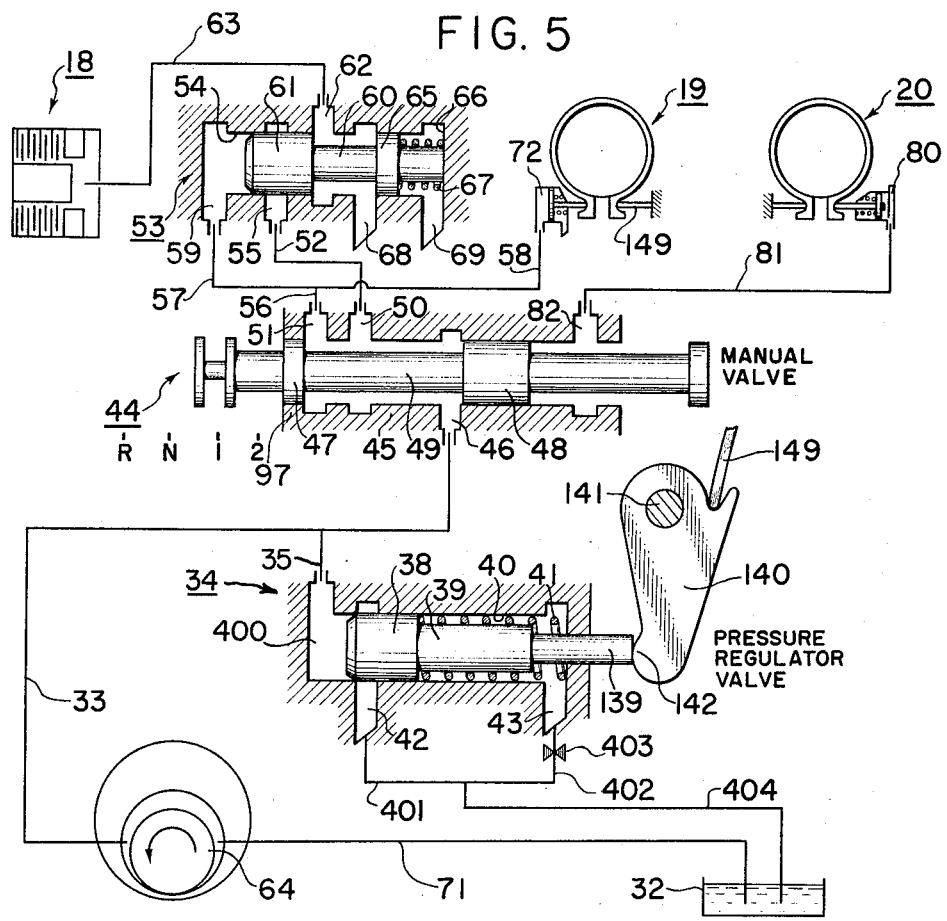
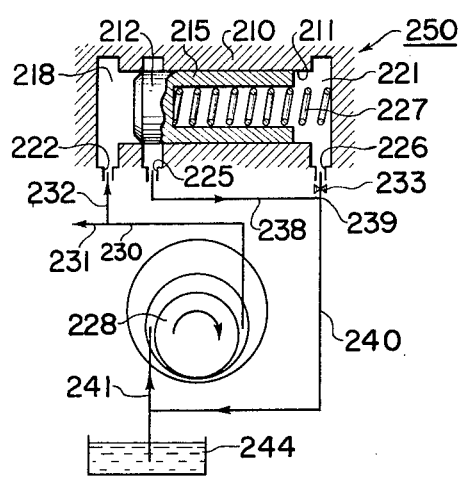
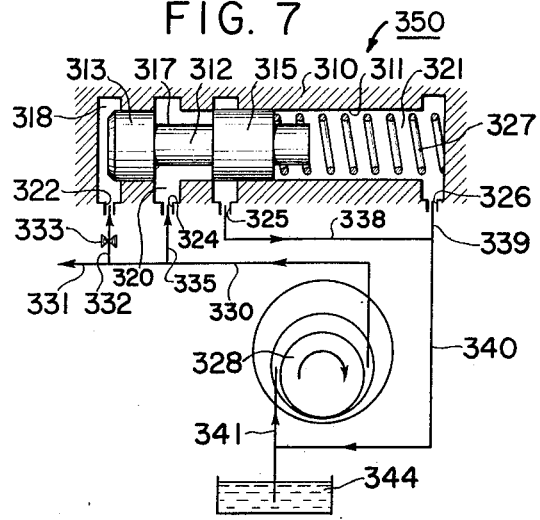

FLUID PRESSURE CONTROL MECHANISM

This invention relates to improvements in and relating to a fluid pressure control mechanism, especially adapted for use with a conventional automatic fluid-operated speed change mechanism for powered vehicle.

In the conventional engageable unit contained in the automotive fluid-operated speed changer of the above kind, as an example, a brake unit employed therein, the input force for the application of a brake band to the cooperating brake drum is constant. However, in the case of a powered vehicle fitted with an automatic speed changer of the above kind, the traction force is reduced with increase of the vehicle running speed, as will be more specifically described hereinafter. It will be seen, therefore, the inputs to the various reaction members of engageable units and of planetary gearings adapted for cooperation with power-transmitting constituents of the automatic speed changer must naturally be kept at their respective constant levels, thus slips caused by an insufficient torque supply or unpleasant shocks caused by an excess torque supply being frequently encountered.

It is therefore a main object of the present invention to provide an improved control mechanism of the kind above referred to capable of modulating the capacity of each of the engageable units contained in the hydraulically operated automatic speed changer in response to occasional variation of the transmitting drive torque.

A further object is to provide a control mechanism of the above kind, capable of substantially obviating conventional slips and shocks in the automatic speed changer.

These and further objects, features and advantages of the invention will become more apparent when read the following detailed description of several preferred embodiments of the invention by reference to the accompanying drawings, in which:

FIG. 5 is a similar view to FIG. 2, illustrative of a preferred third embodiment of the invention.

FIGS. 6 and 7 are sectional views of two modified hydraulic pressure control valve employable in the present invention.

Figure 1:
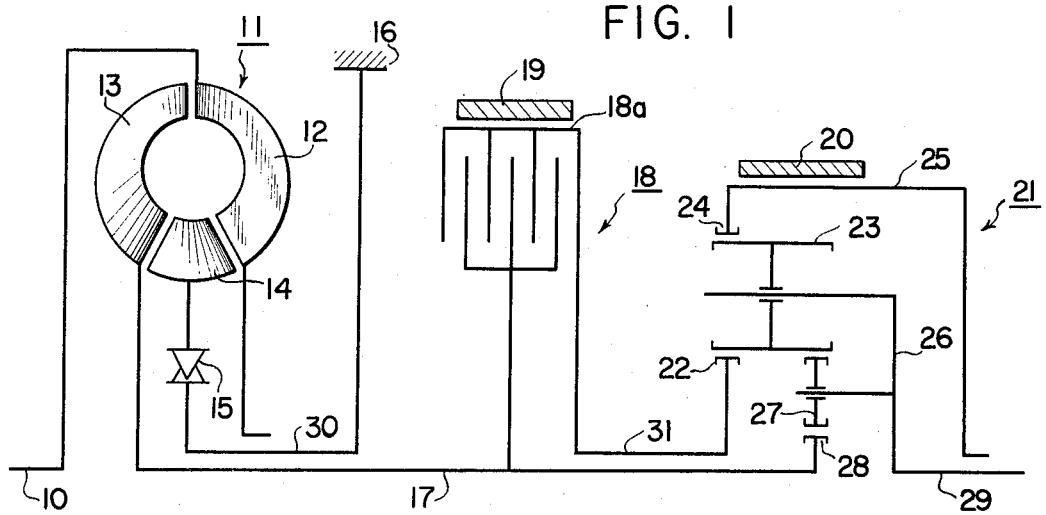
FIG. 1 is a schematic explanatory representation of a fluid-operated automatic speed change mechanism to which the inventive fluid pressure control mechanism cooperatingly fitted, said representation being substantially sectional and a substantially upper half only of the whole arrangement being shown.
Figure 2:
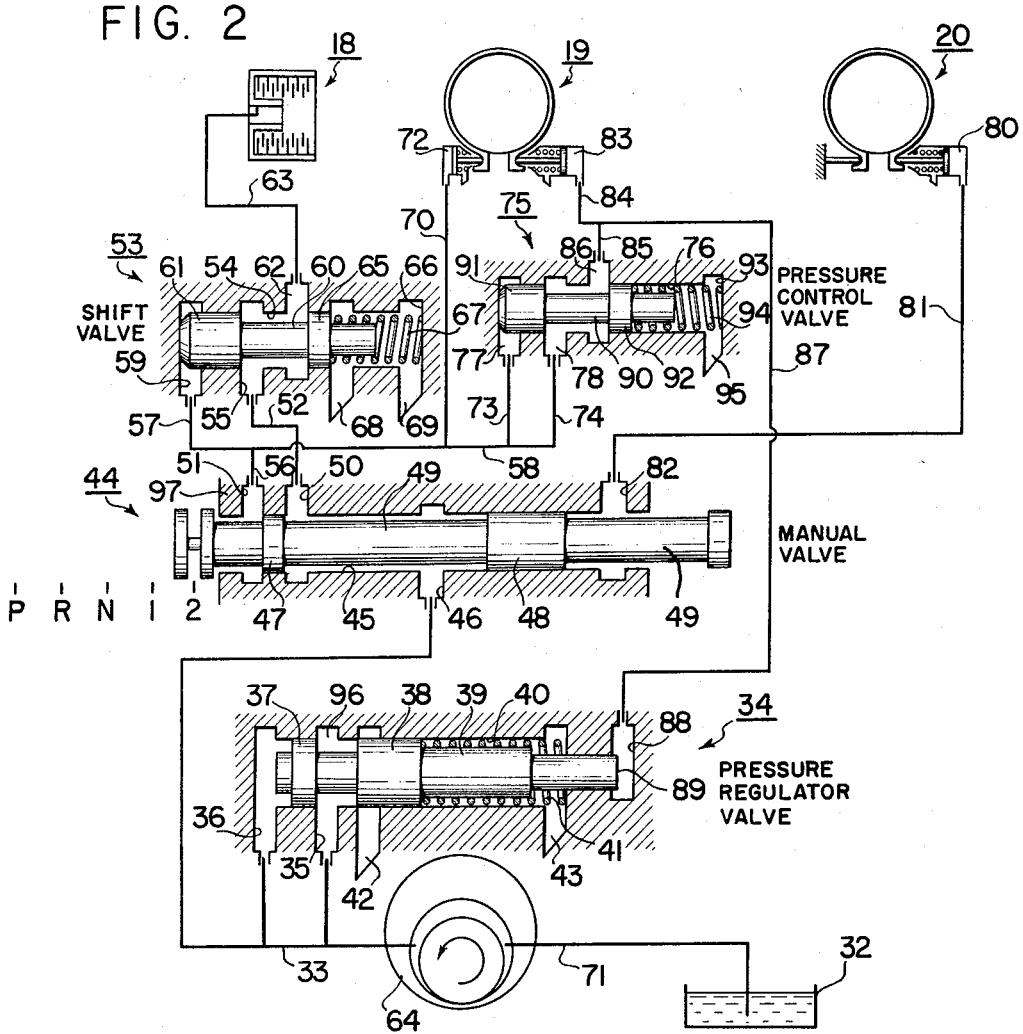
FIG. 2 is a connection diagram of the fluid pressure control mechanism according to this invention wherein, however, main constituents are shown in section.

Referring now to the FIGS. 1 and 2 of the accompanying drawings, the power transmission unit to be controlled by the mechanism according to this invention is of the two-forward speed stage and one reverse speed stage standard type and shown in FIG. 1.

The numeral 10 represents a drive or input shaft which may preferably be the crankshaft of a drive engine, not shown, of a powered vehicle on which the power transmission or automatic speed changer together with the pressure control mechanism is fitted.

The numeral 17 and 29 are an intermediate shaft and an output shaft, respectively, all these shafts 10, 17 and 29 being arranged coaxially one after another. Although not specifically shown, all these shafts are mounted rotatably within a stationary housing 16 which is illustrated only partly and in a highly simplified form.

Within the housing 16, a torque converter 11, a planetary gearing unit 21, a clutch unit 18, a front brake 19 and a rear brake 20 are provided. Torque converter 11 comprises a pump wheel 12, a turbine wheel 13 and a stator wheel 14, as conventionally.

Pump wheel 12 is made rigid with the drive shaft 10; turbine wheel 13 is rigidly connected with intermediate shaft 17 and stator wheel 14 is mounted through one way clutch 15 on a first sleeve shaft 30 fixedly attached to said housing 16. This kind of converter 11 is of the conventional design.

Planetary gearing unit 21 comprises a first sum gear 28, a second sun gear 22, a ring gear 24, a plurality of longer planetary gears 23, a plurality of shorter planetary gears 27 and a carrier 26 mounting rotatably said planetary gears. First sun gear 28 is made rigid with the intermediate shaft 17, while second sun gear 22 is made rigid with a second sleeve shaft 31 which is rotatably mounted on the intermediate shaft 17.

Sleeve shaft 31 is made rigid with drum 18a of clutch unit 18. Gear carrier 26 is made integral with the driven or output shaft 29 and mounts in turn rotatably short planetary gears 27 and long planetary gears 23.

Ring gear 24 is formed on the drum 25 which is rotatably mounted on the output shaft 29.

Long gears 23 are kept in meshing with ring gear 24, second sun gear 22 and short gears 27. Short gears 27 are kept in meshing with first sun gear 28 and long gears 23.

Clutch 18 is so designed and arranged that second sun gear 22 rigid with drum 18a, and first sun gear 28 are made integral with each other into one rigid member. With the clutch 18 kept in its disengaged position, first sun gear 28 is driven by the intermediate shaft 17. On the contrary, when the clutch is kept in its engaged position, both sun gears 22 and 28 are driven simultaneously by the shaft 17.

Brake units 19 and 20 are arranged, when actuated, to apply braking force upon drums 18a and 25 for keeping second sun gear 22 and ring gear 24 in their stationary position. These clutch and brake units 18, 19 and 20 are all of the conventional design.

The power transmission shown in FIG. 1 provides, as was referred to hereinbefore, a forward low speed step, a forward high speed step and a reverse drive step.

With clutch unit 18 and brake units 19 and 20 positioned all in their disengaged position, the transmission is in its neutral position and no drive torque will be transmitted from the drive shaft 10 through intermediate shaft 17 to the driven shaft 29.

When brake is applied to the drum 18a by the brake unit 19 so as to bring second sun gear 22 into its stationary position, the forward low speed drive step is realized. In this case, second sun gear 22 acts as a reaction member in the planetary gear unit 21, and the drive torque transmitted from the drive engine, not shown, through drive shaft 10 is further conveyed through torque converter 11, intermediate shaft 17, first sun gear 28, planetary gears 27; 23 and gear carrier 26 to the driven shaft 29 which is mechanically connected through proper connection means to a drive wheel, not shown, adapted for driving vehicle wheels, again not shown.

The forward high speed drive step is realized by bringing the clutch 18 into engagement, while the brake units 19 and 20 are brought into in their disengaged position. With the clutch 18 engaged, both sun gears 22 and 28 are fixed, thus the constituent gears of the unit 21 being brought into solid to each other and a direct coupling condition between the drive shaft 10 and the driven shaft 29 being thereby realized.

The rear drive step is realized by bringing the rear brake unit 20 into its engaged position and by disengaging clutch unit 18 and front brake unit 19.

Brake 20, when applied, acts to keep ring gear 24 in its stationary position so as to utilize it as a reaction. In this case, the forward drive torque supplied to first sun gear 28 is reversed by planetary gear unit 21, thus the gear carrier 26 and the driven shaft 29 being driven in the opposite direction to the rotation of drive shaft 10.

Next, referring to FIG. 2, the pressure control mechanism according to this invention will be described hereinbelow in detail.

The numeral 64 denotes a pump unit driven from the drive engine, although the connection means have been omitted from the drawing only for simplicity, said pump being connected through a conduit 71 to a reservoir 32 and through a conduit 33 to ports 35 and 36 formed through the wall of a cylinder 40 of a pressure adjusting valve unit 34.

The cylinder 40 receives slidably a valve member 39 which is formed with a pair of separated lands 37 and 38 having a common outside diameter. Between valve land 38 and the end of cylinder 40, there is inserted a spring 41 for urging the valve member 39 to move in the leftward direction in FIG. 2.

Ports 42 and 43 are kept in fluid communication with reservoir 32, although the connecting piping have been omitted from the drawing for simplicity. Conduit 33 is fluidically connected with a port 46 which is bored laterally through the wall of cylinder 45 of manual valve unit 44.

Manual valve 44 comprises a valve member 49 fitted with a pair of separated lands 47 and 48 and received slidably in the longitudinal bore of said cylinder 45. Ports 50 and 51 are bored laterally through the wall of cylinder 45, first port 50 being kept in fluid communication through conduit 52 to a port 55 formed through the wall of cylinder 54 of shift valve unit 53.

Port 51 fluidically communicated through a conduit 56 to branch conduits 57 and 58, of which the first conduit 57 is kept in communication with port 59 of shift valve 53 and arranged to exert a hydraulic pressure upon the land at 61 of valve member 60 which is slidable within the cylinder 64 of valve unit 53. Conduit 58 is dept in communication through conduit 70 to the hydraulic working chamber at 72 of front brake unit 19, and through branch conduits 73 and 74 respectively to ports 77 and 78 formed in the cylinder at 76 of a hydraulic pressure control valve unit 75. The numeral 65 represents a land 65 formed on valve member 60 which is urged to move leftwards in FIG. 2 under the spring force at 67. This spring 67 is inserted between the valve land 65 and the cylinder end at 66.

Ports 68 and 69 are discharge ports kept in fluid communication with the reservoir 32, although the communication means have been omitted from the drawing only for simplicity.

Hydraulic working chamber 80 of rear brake unit 20 is fluidically connected through a conduit 81 to a port 82 which is formed in the cylinder 45 of manual valve unit 44. The numeral 83 represents a reaction chamber which receives the reaction force developed in the front brake unit 19, said chamber 83 being kept in fluid communication through conduits 84 and 85 to a port 86 formed in the valve unit 76. The chamber 83 is fluidically connected through conduit 87 to a small chamber 88 formed in the pressure regulator valve unit 34. Into this small chamber 88, the reduced end at 89 of the valve member 39 of the valve unit 34 project, so as to receive the hydraulic pressure of valve unit 34. Fluid pressure control valve unit 75 comprises a valve member 90 axially slidable in a cylinder 76 of the unit 75, said valve member being formed with a pair of separated lands 91 and 92.

Valve member 90 is urged constantly to move leftwards in FIG. 2 under the influence by a spring inserted between valve land 92 and cylinder end 93. A discharge port 95 is provided which is kept in fluid communication with the reservoir 32, although the communication means have been omitted from the drawing only for simplicity.

The operation of the mechanism as shown and described is as follows.

Now assuming that the various valve units are positioned in their normal position shown, with the valve member 49 of manual valve unit 44 positioned at "2-range position." The hydraulic pressure supplied by pump 64 is conveyed through conduits 35 and 36 to a ring space 96 formed between valve lands 37 and 38 and to the left side of land 37.

With increase of the delivery pressure from pump 64 and the hydraulic pressure acting upon the left side surface of valve land 37 becomes larger than the spring pressure at 41, the valve member being shifted rightwards. With rightward shift of valve land 38, the chamber 96 being brought into fluid communication with the discharge port 42. With decrease of the hydraulic pressure acting upon the left hand side of land 37, the valve member is shifted under predominant influence of spring pressure at 41, the land 38 interrupts the communication between the ports 35 and 42. In this way, the delivery pressure from pump 64 will be kept at a certain constant valve.

In this way, an adjusted oil pressure to a certain constant level is supplied to the port 46 of manual valve 44, the pressure oil being conveyed through port 50, conduit 52, ports 55 and 62 and conduit 63 to clutch 18 which is thus actuated for the realization of the forward high speed drive step.

When the manual valve 44 is shifted to "1-position" by manipulating a proper manual means such as accelerator pedal, the valve member 49 will be shifted leftwards, until the land 47 is brought into opposition to the cylinder part 97 and the left end of land 48 is brought into registration with the right-hand end of port 46. Under these operating conditions, the constant oil pressure delivered from pump 64 through pressure regulator valve unit 34 is conveyed further through conduit 33, ports 46; 50 and conduit 52 to port 55, and at the same time, through port 51, conduits 56 and 57 to port 59. Upon application of this oil pressure to port 59, valve member 60 will be shifted to the right against the spring force at 67, and the port 44 is interrupted by the end of land 61 for interrupting the pressure oil supply to the clutch 18, while oil pressure is supplied through conduits 56, 58 and 70 to the hydraulic working chamber 72 of brake unit 19.

At the same time, hydraulic pressure is supplied from conduits 73 and 74 to the both sides of land 91 formed on the valve member 90 of valve unit 75, the hydraulic pressure acting upon the left-hand surface of valve land 91 acts upon valve member 90 against spring action 94 so as to move the member rightwards for interrupting the already established hydraulic communication between port 74 with the hydraulic chamber of front brake unit 19. During inactivation of the front brake unit 19, ports 86 and 78 are kept in fluid communication with each other, and the pressure oil prevailing between port 88 and reaction chamber 83 is returned through conduit 56 and port 51 to reservoir 32, thereby no hydraulic pressure acts upon the reduced end 89 of valve member 39 of pressure adjusting valve unit 34. Even when fluid communication between port 86 and 78 should be kept in interruption, the residual hydraulic pressure prevailing between port 88 and reaction chamber 83 will do for the desired purpose, if it does not adversely affect upon the pressure adjusting valve 34 during the non-applied position of the front brake unit 19.

When the hydraulic pressure is supplied to the supply chamber 72 of front brake 19, the latter i s thereby caused to actuate and a reaction oil pressure in relation to the braking torque is conveyed from reaction chamber 83 through conduits 84; 87 to small chamber 88 in which the reduced end part 89 of pressure regulator valve 34 projects and, therefore, the latter is hydraulically urged. The reaction oil pressure acting upon the reduced valve end acts, being assisted by the spring force 41, upon the valve member 39 leftwards in FIG. 2. Therefore, the oil pressure subjected to adjustment by the valve 34 becomes higher than before, and is supplied to the supply chamber 72 of front brake unit 19. In this way, the reaction pressure is modified in accordance with occasional variation in the torque transmitted from the drum 18a of front brake 19. Therefore, the oil pressure adjusted by the valve unit 34 will vary with the torque as supplied.

Figure 3:
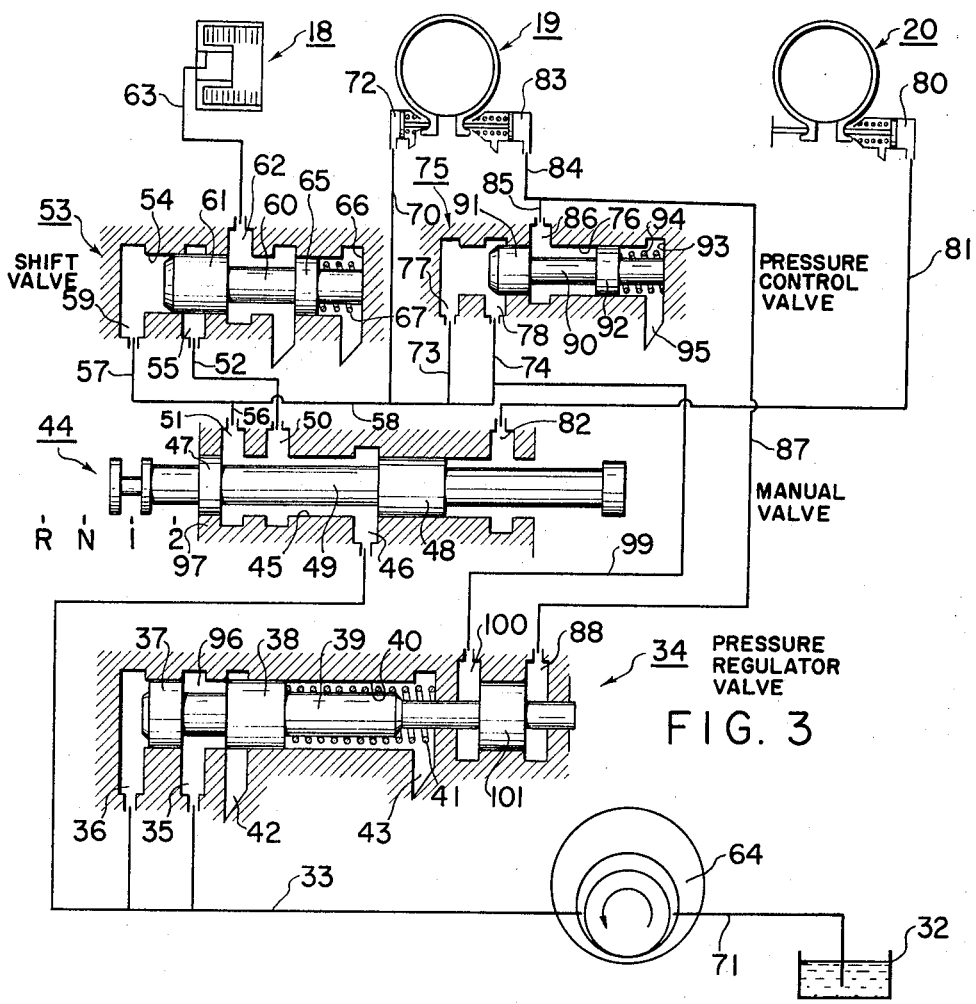
FIG. 3 is a similar view to FIG. 2, illustrative of a preferred second embodiment of the invention.

The second embodiment of the invention is shown in FIG. 3. Substantial constituent parts of the present embodiment are similar to those employed in the foregoing first embodiments. For easy identification and comparison purpose, these similar parts are denoted respective same reference numerals as before.

The main structural difference of the present embodiment from the second one resides in the following.

Conduit 99 is connected at its one end with conduit 58, while the opposite end of conduit 99 is fluidically connected with a port 100 which is formed in the pressure adjusting valve unit 34. More specifically, the port 100 is provided between discharge port 43 and port 88, valve land 101 formed on valve member 39 is arranged to be slidable between ports 88 and 100 and within the longitudinal bore of cylinder 40.

The operation of this second embodiment is as follows:

With the manual valve 44 manipulated to "1-position" wherein various valve units are positioned as shown in FIG. 3, pressure oil delivered from pump 64 is subjected to adjustment by pressure adjusting valve 34 and then fed to the port 46 of manual valve 44. The pressure oil fed to port 46 is conveyed through port 51, conduits 56; 57 to the left-hand side surface of the land 61 on valve member 60, so as to urge hydraulically the latter to move rightwards for interrupt the oil passage from port 50 to clutch 18.

Pressure oil in conduit 56 is supplied through conduits 58; 70 to supply chamber 72 of front brake unit 19 for actuation thereof, and it will be conveyed through duct 73 and act upon the left side surface of valve land 91 formed on valve member 90 in the hydraulic pressure control valve unit 75, for hydraulically urging the valve member to slide rightwards, so as to interrupt the fluid communication between ports 78 and 86. On the other hand, pressure oil is conveyed from conduit 58 to port 100 of adjuster valve unit 34, the hydraulic pressure thus acting upon the left-hand side surface of valve land 101 on valve member 39 and said hydraulic pressure being equivalent to that now prevailing in the brake unit 19. Upon the right-hand side surface of valve land 101, the pressure oil from the reaction chamber 83 of brake unit 19 will act, and, indeed, through the intermediary of conduits 84, 87 and port 88.

In the engageable unit, for instance, a brake unit as its representative example, the acting force or impact force $F_a$ and reaction force $F_r$ may be defined by the following formula:

$$T = (F_r - F_a)R \quad (1)$$

where,

T stands for the torque applied to the brake hand; or friction torque acting between brake hand and brake drum;

R stands for the radius of the brake drum;

therefore, $$F_r = T/R + F_a \quad (2)$$

The reaction equals to the input plus $T/R$.

From the above Formula (1), $F_r$ is larger than $F_a$ and thus, a oil pressure $F_r - F_a$ will act upon the right-hand side surface of valve land 101 so as to urge the valve member to move leftwards and this urging action is assisted by the spring force at 41. Therefore, pressure oil will be conveyed through port 36 to port 46 and the oil pressure will be adjusted to a higher level by the reaction input acting upon the both side surfaces of valve land 101.

A third embodiment of the invention is shown in FIG. 5 of the accompanying drawing.

64 represents a pump which communicates through conduit 71 to reservoir 32. On the other hand, the pump 64 communicates through conduit 33 to port 35 bored laterally through the cylinder 40 of pressure regulator valve 34. Valve unit 34 comprises valve member 39 which is formed with land 38 having a common outside diameter, said valve member being slidably received within the longitudinal bore of the cylinder 40. A compression spring 41 is inserted between valve land 38 and the corresponding cylinder end, so as to urge the valve member 39 to move leftwards in FIG. 5. 42 and 43 represent discharge ports communicating with the reservoir 32. Conduit 33 is kept in fluid communication with port 46 formed in the wall of cylinder 45 of manual valve unit 44.

Manual valve 44 comprises a valve member 49 formed with lands 47 and 48, said valve member being received slidably in the cylinder 45. Ports 50 and 51 are formed in the cylinder 45. Port 50 communicates through conduit 52 to port 55 formed in the cylinder 54 of shift valve 53. It communicates further through port 62 and conduit 63 to the supply side of clutch unit 18. Port 51 is connected through conduit 56 to two branches 57 and 58. Conduit branch 57 communicates with port 59 so as to impress hydraulic pressure upon the land 61 on valve spool 60 which is slidably received in the cylinder 54 of shift valve unit 53. The hydraulic pressure will be conveyed through conduit 58 to the supply chamber 72 of front brake unit 19. A land 65 is formed on shift valve 60 subjected to an urging force exerted by a spring 67 inserted between said land and cylinder end wall 66. Ports 68 and 69 are provided for discharge purpose to the reservoir 32.

Supply chamber 80 is kept in fluid communication through conduit 81 with port 82 formed in the cylinder 45 of manual valve 44.

Numeral 149 is a strut adapted for receiving brake reaction in front brake unit 19 and acts to brake the drum 18a by the actuation of front brake unit 19 when hydraulic pressure prevails in the supply chamber 72. At this stage, the strut 149 is subjected to a reaction $F_r$ in response to the braking torque. Strut 149 is mounted on a lever 140 pivoted on a lever pin 141 which is fixedly mounted on a stationary casing, not shown. The strut will act upon lever 140 so as to rotate the latter for urging valve member 139 of valve unit 34 towards left by cooperation with spring 41. By this pressure adjusting operation, the related hydraulic pressure will be adjusted to a higher level.

The adjusted hydraulic pressure will be fed to the supply chamber 72 of front brake unit 19, and since the reaction force is modulated in response to the torque received by the front brake 19 from the drum 18a, the hydraulic pressure subjected to adjustment by the valve unit 34 will vary with variation of the torque transmitted.

In the foregoing description, all the embodiments have been arranged so as to control the acting force or input force to the front brake unit. Similar control may naturally performed on other brake unit by providing similar arrangement therefor. It is also possible to control the hydraulic pressure in the aforementioned way in the engageable means of a three forward speed type automatic or even manual speed changer of the fluid operated type.

Figure 4:
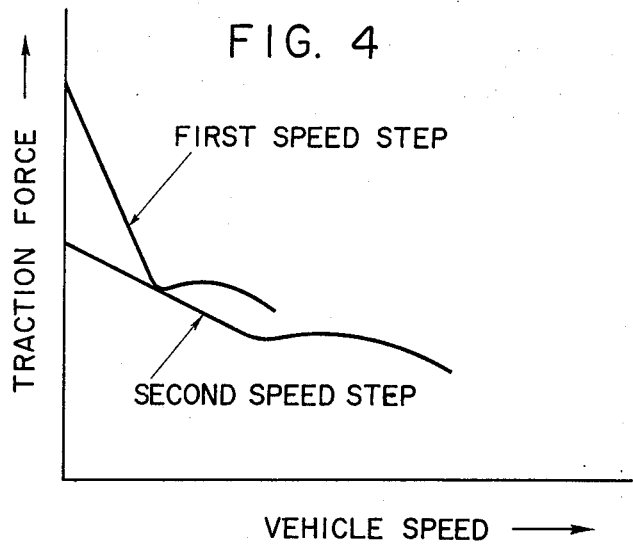
FIG. 4 is an explanatory diagram of the traction force of a powered vehicle fitted with a fluid-operated automatic speed changer, being plotted against the vehicle speed.

An example of the variation of the traction force of the fluid-operated automatic speed changer is seen in the chart shown in FIG. 4 which has been plotted against the vehicle speed. It is self-explanatory and serves for better understanding of the nature of function of the inventive pressure control mechanism according to this invention.

In the valve arrangement shown in FIG. 6, disadvantageous oscillative movement of a pressure regulator valve can be obviated substantially. A similar representation shown in FIG. 7 illustrates a conventional comparative one.

Numeral 210 shown schematically a valve housing which is provided with a longitudinal bore 211 in which a valve member 212 is received slidably.

Valve housing 210 is formed with ports 222, 225 and 226 which are kept in fluid communication with the valve bore 211.

Within the valve bore 211, two separated oil chambers 218 and 221 are formed by said valve member. A spring 227 is provided within oil chamber 221 for urging the valve member to move leftwards in FIG. 6. Numeral 228 denotes pump which sucks oil through suction pipe 241 from an oil reservoir 244. The sucked oil is delivered from the pump to a discharge pipe 39 which communicates with a port 222 of said oil chamber 218 through a conduit 232. Port 225 is kept in fluid communication through conduits 238 and 240 to the reservoir 244.

Port 226 is connected through conduit 239 provided midway with an orifice 233, said conduit being hydraulically connected to a further conduit 240. Discharge conduit 230 is connected to an outlet conduit 231. The pressure-adjusted oil is connected to any of the foregoing hydraulic circuits corresponding to respective embodiments for supply of controlled pressure oil.

The pressure control mechanism 250 is positioned at a lower level than the oil level in the reservoir 244.

In this prior mechanism, a ring groove 317 is formed midway on the valve spool 312 by the provision of two separated lands 313 and 315. A ring space 320 kept in fluid communication with the interior of said ring groove 317 is specifically provided in this valve unit. A conduit 335 is further provided which is hydraulically connected with discharge conduit 330, on the one hand, and with said ring space 320, on the other hand.

Similar arrangement shown in FIG. 7 represents a comparative conventional arrangement. Similar parts of this prior mechanism as those of that shown in FIG. 6 are denoted with respective same reference numerals each added with 100 for easy identification and comparison.

Conduit 332 which connects end chamber 318 with delivery conduit 331 is formed midway with an orifice 333, while the conduit 339 connecting the chamber 321 to discharge conduit 340 leading to the reservoir 314 is fitted with no orifice means.

The operation of the pressure control valve mechanism shown in FIG. 6 will be described hereinbelow in comparison with that of the conventional one shown in FIG. 7.

Pump 228 or 328 sucks oil from reservoir 244 or 344 and delivers a pressurized oil flow through conduits 230 or 330 and 232 or 332 to the chamber 218 or 318. The thus supplied oil pressure to the last-mentioned chamber will act upon the valve spool 212 or 312 against the action of spring 227 or 327 so as to urge the spool to move rightwards in FIG. 6 or 7. When this hydraulic urging pressure overcomes the counter spring action, the spool will shift rightwards, until discharge port 225 or 325 is opened for bringing the chamber 218 or 318 and discharge conduit 238 or 338 into fluid communication with each other, so as to reduce the oil pressure in the chamber 218 or 318.

With the thus reduced oil pressure, spring pressure at 227 or 327 will become predominant for urging the valve spool to move leftwards, until the fluid communication between the port 225 or 325 and the chamber 218 or 318 is interrupted. At the last moment, the spring pressure will become in balanced-out condition with the hydraulic urging force, so as to set the oil pressure in the conduit 230 or 330 to a certain desired level, as determined by the thus occasionally invited spring pressure. The thus adjusted oil pressure by the pressure control valve 250 or 350 may be utilized as the "line pressure" referred to hereinbefore in connection with FIGS. 1, 2, 3 and 5.

When the valve unit 250 or 350 acts to set in the above mentioned way the variable line pressure, substantial oscillation of the valve spool will be frequently and disadvantageous invited.

By the provision of the orifice 233 or 333, thereby providing a hydraulic damping force for suppressing the disadvantageous valve oscillation will be provided. In the arrangement proposed by the invention, the damping orifice is provided in the discharge piping system leading from the discharge port 226 to the reservoir 244, in place of the delivery piping leading from the delivery side of pump 328 to inlet port 324.

For the realization of this damping purpose, the provision of land 315 was necessary according to the prior art, in addition to the provision of the chamber 320, conduit 335 and the like. According to the novel arrangement, the pressure control unit may well be dispensed with these additional parts which simplifies substantially the whole valve structure.

The embodiments of the invention in which an exclusive property or privilege is claimed are as follows:

1. A pressure control device for a hydraulic fluid operated speed change mechanism utilizing a transmission gear set and various friction engaging devices for effectuating various gear ratio linkages in a power train comprising:
   a reservoir for the hydraulic fluid;
   a pump connected to the reservoir;
   control means for regulating the desired gear ratio linkages and receiving hydraulic fluid under pressure from the pump;
   at least one hydraulic force device connected to the control means for actuating a friction engaging device;
   a reaction member means connected to the friction device for producing a signal proportional to the reaction force generated by the engagement of the friction engaging device, and
   pressure adjusting valve means for regulating the pressurized hydraulic fluid supplied to the control means in response to the signal generated by the reaction member means by metering the hydraulic fluid to the reservoir, whereby sudden shocks from insufficient or excessive torque to the friction engaging devices are prevented.

2. A pressure control device as in claim 1, where the pressure adjusting valve means includes a valve spool and a cylinder, one side of the valve spool connected to the hydraulic force device for generating one force, while the other side is connected to the reaction member means for generating an opposing force, whereby the resultant of the forces controls the metering of the hydraulic fluid to the reservoir.

3. A pressure control device as in claim 1, where the reaction member means includes a strut and a camming lever for transmitting a force to the pressure adjusting valve means, the pressure adjusting valve means further including a cylinder, a metering valve spool mounted in the cylinder and a conduit having a restrictive orifice for supplying metered hydraulic fluid to the same side of the valve spool as the camming lever force whereby oscillations of the metering valve spool will be damped.

4. A fluid operated speed changer for a vehicle comprising:
   a planetary gearing means for providing speed reductions;
   a reservoir of hydraulic fluid;
   a pump means connected to the reservoir;
   a pressure regulator valve means for distributing hydraulic fluid from the pump means, and
   engagement control means for controlling the actuation of the planetary gearing means including an input means, a reaction means, and a fluid pressure control means provided between said input and reaction means for connecting said pressure regulator valve so as to actuate said reaction means in the pressure increasing direction of said pressure regulator valve in case of energization of said input means, and for interrupting the cooperating conditions of said reaction means and said pressure regulator valve in case of failure of fluid pressure to be conveyed to said input means.

* * * * *